United States Patent [19]

Bricard et al.

[11] 4,111,260

[45] Sep. 5, 1978

[54] METHOD OF HEAT ACCUMULATION AND A THERMAL ACCUMULATOR FOR THE APPLICATION OF SAID METHOD

[75] Inventors: Alain Bricard, Grenoble; Maurice de Cachard, La Tronche, both of France; Pierre Goffinet, Brussels, Belgium; Gérard Kurka, Meylan; Robert Moracchioli, Seyssinet, both of France

[73] Assignee: Commissariat a l'Energie Atomique, Paris, France

[21] Appl. No.: 551,828

[22] Filed: Feb. 21, 1975

[30] Foreign Application Priority Data

Mar. 1, 1974 [FR] France .................................. 74 07079
May 31, 1974 [FR] France .................................. 74 19072

[51] Int. Cl.² ........................................... F28D 21/00
[52] U.S. Cl. .................................. 165/104 S; 165/111; 126/400; 62/59
[58] Field of Search ............ 165/104 S, 111, DIG. 4; 126/400; 62/59, 530, 425

[56] References Cited

U.S. PATENT DOCUMENTS

| | | | |
|---|---|---|---|
| 1,297,633 | 3/1919 | Ashley | 62/59 |
| 2,101,953 | 12/1937 | Oman | 62/59 X |
| 2,528,449 | 10/1950 | Norton | 62/425 |
| 2,631,835 | 3/1953 | Jones | 165/107 X |
| 2,996,894 | 8/1961 | Shade | 62/59 |

Primary Examiner—Albert W. Davis, Jr.
Attorney, Agent, or Firm—McNenny, Pearne, Gordon, Gail, Dickinson & Schiller

[57] ABSTRACT

A heat-transporting fluid F is passed over a material C having a high latent heat of fusion and in direct contact therewith so that the fluid and the material exchange heat at a temperature close to the melting point of the material. By contacting the hot fluid F with the material C, this material melts and accumulates heat in the form of latent heat of fusion while cooling the fluid F. When the cold fluid is contacted directly with the material C, this material solidifies and releases heat which is transmitted to the fluid F.

4 Claims, 6 Drawing Figures

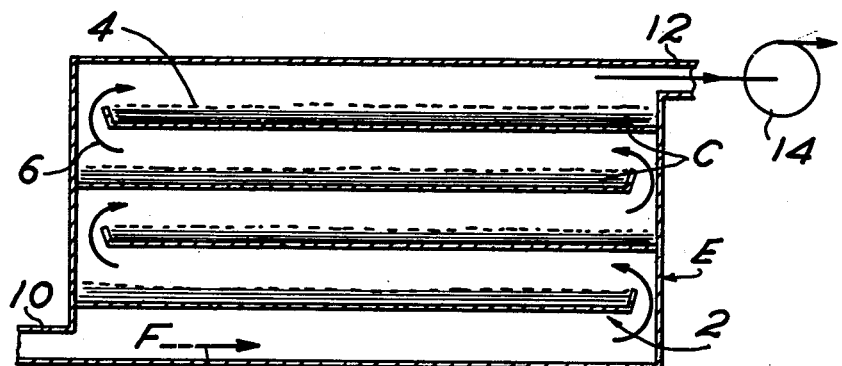
FIG.1
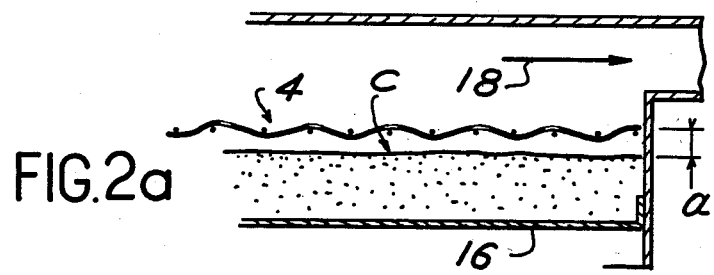
FIG.2a
FIG.2b
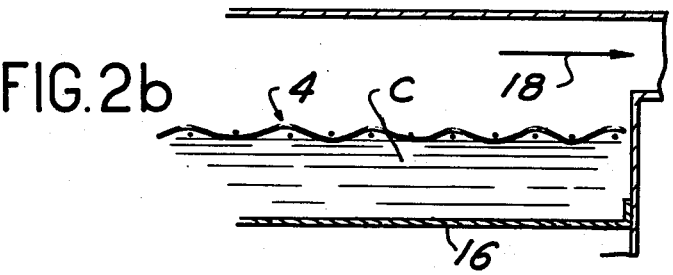
FIG.3
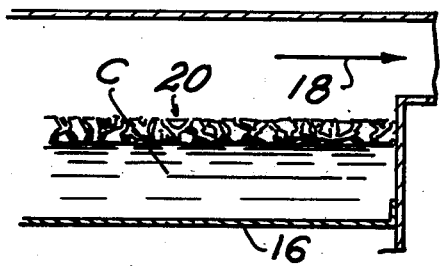

METHOD OF HEAT ACCUMULATION AND A THERMAL ACCUMULATOR FOR THE APPLICATION OF SAID METHOD

This invention relates to a method of heat accumulation and to a thermal accumulator which operates on the principle of heat storage by fusion of pure substances or congruent-fusion eutectic mixtures in which heat transfer processes take place between the fluid substance and a heat-transporting fluid.

There are many known types of heat-accumulation devices. They are essentially intended to be employed either in conjunction with Rankine or Stirling cycle engines or for the accumulation of solar energy or alternatively for air-conditioning requirements in a submarine medium. The invention can be employed for the same requirements but its use can be extended to applications calling for high-energy fluxes and a short charge time.

In particular, one of the main applications of this invention is the operation which consists in coupling to an energy source so as to achieve a substantial improvement in the load factor. The accumulator thus performs the function of an "energy store" between the generator and the load, so that the generator need only supply the mean power since the accumulator integrates peak load consumption values. This coupling can be carried out for example between an electric power plant of conventional or nuclear type and the boiler. Said accumulator is also capable of operating under conditions of total containment and complete independence of surrounding media by adding a second storage at lower temperature so as to constitute a cold source. An arrangement of this type can constitute in particular an energy source for oceanographic applications.

A novel application of this form of storage could be a system for providing regulation and safety by means of an isotopic generator constituting the energy source of an artificial heart. Another application could be the use of this type of accumulator as a power generator for a non-polluting type of motor vehicle.

In thermal accumulators, the material which stores heat as a result of temperature build-up must be in a condensed form in order to ensure that the amount of heat stored per unit of volume is as large as possible.

In all accumulation systems of the prior art, a heat-transfer wall was interposed between the heat-transporting fluid and the material in which the energy was stored. This separation between the material and the fluid has the advantage of preventing any mixing between these two substances but has the serious disadvantage of delaying the transfer of energy between the fluid and the energy-accumulating material since a temperature gradient must necessarily be established in the wall which forms a separation between the heat-transporting fluid and the storage material. In the prior art, the materials which constitute the heat accumulator are often contained in metal vessels. Moreover, the variations in volume of the storage material under conditions of pressure and recrystallization form insulating gas layers in the vicinity of the separating wall. In the majority of instances, since the solid has higher density than the liquid, the specific volume of the material decreases at the time of crystallization and a vacuum is produced between the wall and said material. This space has the result of giving rise to heat insulation which proves unfavorable to heat exchange between the energy-accumulating material and the heat-transporting fluid. In order to prevent the appearance of this heat-insulating gaseous space, steps have been taken in the prior art to provide deformable vessels which are both difficult and costly to construct.

The present invention is directed to a method of thermal accumulation in which a heat-transporting fluid F is passed in direct contact over a material C having a high latent heat of fusion, the fluid F and the material C being intended to exchange heat at a temperature in the vicinity of the melting point of the material C with the result that, when the hot fluid F is passed in direct contact over the material C, the material C melts and accumulates heat in the form of latent heat of fusion while cooling the fluid F and that, when the cold fluid F is passed in direct contact over the material C, said material C solidifies and releases heat which is transmitted to the fluid F.

The material C is a pure substance or a congruent-fusion eutectic mixture.

Moreover, it is often desirable to increase the contact surface area between the material C and the heat-transporting fluid F in order to optimize heat exchanges between these two substances. It is finally an advantage to ensure that the heat exchanges take place at the time of cocurrent or countercurrent circulation of the fluid F and of the material C in the liquid or solid state since the circulation of the two substances make it possible to increase the speed of heat exchanges, especially in countercurrent flow.

The present invention is also directed to a variant of the method of accumulation and restitution of heat wherein heat exchanges between a heat-transporting fluid F and a material C take place by direct contact between the fluid F and the material C which is fusible at a temperature close to the melting point of said material, and wherein the heat exchanges between the two substances are promoted by a fine division of the material C both in the liquid state and in the solid state. In order to optimize the heat exchanges between the fluid F and the material C, said material is initially in liquid form and, in one embodiment of the invention, exchanges heat in countercurrent flow with the fluid F which cools and solidifies said material in the form of granules.

More precisely, one mode of execution of the method according to the invention consists in circulating a hot heat-transporting fluid F in direct contact with a material C having a high latent heat of fusion and in the form of a divided solid (granules), the temperature of the fluid F being higher than the temperature of fusion of the material C in the heat-storage phase. The heat released by the hot fluid F has the effect of liquefying the material C and the heat is stored mainly in the form of latent heat of fusion in the material C in the liquid state. In the heat restitution phase, said material C is circulated in the form of liquid droplets in direct contact with the fluid F, the temperature of which is lower than the temperature of the material C, whereupon said material C condenses to form grains and transfers heat to the fluid F. The heat transferred to the fluid F is recovered within a heat exchanger located outside the thermal accumulator.

By reason of the fact that the ratio of heat-exchange surface to volume of each grain of the material C is higher than in any other known method, energy is introduced with a high degree of efficiency. Moreover, as in the first method, heat exchanges are carried out at a constant temperature of the material C which is equal to the melting point of said material, thus resulting in enhanced efficiency of heat exchanges.

The heat storage material C must have a high enthalpy of fusion, good heat conductivity at the melting point, a moderate coefficient of expansion per unit volume as well as low reactivity in the surrounding medium (low corrosion, low chemical inertia with respect to the heat-transporting fluid F).

The melting point of the material C must be sufficiently high to ensure that the related heat of fusion is appreciable; it must not, however, exceed reasonable limits in order to limit the problems of reactivity, corrosion and thermal insulation.

In accordance with the invention, the material C is a congruent-fusion eutectic mixture such as a eutectic mixture of barium fluoride and lithium fluoride, for example. More generally, it is also possible to employ fluorides or chlorides of alkali metals or alkaline-earth metals or alternatively an oxide or a hydroxide of these metals.

The choice of the heat-transporting fluid F is directed to compounds which have high surface tension, low wettability and in which both the surface tension and the density are different from those of the material C. Furthermore, the material C in either the solid or liquid form must not have any character of either solubility or miscibility with the fluid F. Depending on the temperature ranges which include the melting point of the storage material, the following can be employed in particular:

air, carbon dioxide gas, nitrogen or any gas desired,
water in the condensed form, in the form of steam or alternatively in the form of a two-phase water-steam mixture,
the polyphenyls as well as their substituted derivatives up to 280° C,
the light metals having low wettability such as potassium, sodium or the potassium-sodium alloys.

In another mode of execution of the method according to the invention, and in order to promote heat exchanges between the fused material C and the fluid F, the material C is sprayed in the liquid state into the stream of fluid F.

In this alternative form, the material C and the heat-transporting fluid F are chosen so as to have different densities and surface tensions at the melting point of the material C, thus promoting their separation and the formation of droplets.

The present invention is also directed to a first thermal accumulator having a latent heat of fusion in which the heat-transporting fluid in the liquid or gaseous state (or even in the form of a liquid-gas mixture) is contacted directly with the material C for accumulating energy in the form of heat. Said accumulator can be employed for storing high energy fluxes. Moreover, a good contact between the heat-transporting fluid F and the material C permits short charge times.

In more precise terms, the first thermal accumulator in accordance with the invention essentially comprises means for storing a material C having a high latent heat of fusion and means for circulating a heat-transporting fluid F so that the fluid F and the material C are in direct contact and exchange heat, said heat exchange being carried out essentially at a temperature in the vicinity of the melting point of the material C.

The means for storing the material C are containers made of sheet metal or of wire fabric, for example.

The direct-contact accumulator thus comprises a mass of a material C which is suited to heat storage by virtue of the fact that, in addition to a high heat of fusion, said material has little corrosive action on its enclosure and that it is chemically inert with respect to the heat-transporting fluid. Furthermore, in order to promote heat exchanges, said material must essentially have good heat conductivity at the melting temperature.

When it is desired to store energy in a thermal accumulator, the fluid F is cooled in contact with the material C which is initially in solid form, said fluid F being admitted in the hot state and discharged in the cold state after passing through the vessel which contains the material C. At the end of this accumulator-charging operation, a large portion or the entire quantity of the material C is in the liquid state. Conversely, when the thermal accumulator is employed for the purpose of delivering energy, the heat-transporting fluid passes into the vessel in the cold state, is heated by passing in the vicinity of one or a number of trays containing the material C and is discharged in the hot state. This heat exchange takes place essentially at a temperature in the vicinity of the melting point of the material C which, at the end of this discharge operation, has a higher proportion of material C in solid form than at the outset. One advantage of the present invention is to restitute the latent heat of fusion at a constant temperature of the material C, thus facilitating heat-transfer processes since the temperature differences between fluid F and material C are higher than if the two materials had exchanged heat at a variable temperature.

The latent heat of fusion is restituted from the material C to the fluid F at the time of resolidification of the material C without any increase in entropy as is the case when the storage takes place in the form of sensible heat.

It is readily apparent that the heat flux required for maintaining the storage material in the liquid phase is very small with respect to the latent heat of fusion at constant pressure (or enthalpy of fusion of said material); the circulation of heat-transporting fluid can be interrupted for a few hours provided that the thermal insulation of the vessel containing the tray is carried out with sufficient care.

The heat can also be stored in the thermal accumulator by means other than the flow of heat-transporting fluid F. For example, heat can be stored in the material C by passing a current through an insulated resistor which is immersed in the material C. On the other hand, the extraction of heat will be carried out by contacting a heat-transporting fluid F with the material C.

In one embodiment of the invention, the thermal accumulator comprises a leak-tight vessel in which is placed a series of trays arranged in tiers or stages in which the fissile material C is placed, said trays being also provided with communications between the different stages such that, as it flows through the vessel, the fluid F exchanges heat with the material C located within all the trays.

It is preferable to form the trays of metallic materials which have good heat conductivity and thus assist the distribution of heat between the different points of the vessel which contains the material C. The metal used for the different trays placed in series is chosen so as to ensure that it is not liable to be attacked either by the solid or by the liquid C. The stacked array of one series of trays containing the material C constitutes an energy accumulation module comprising an inlet and an outlet, the circulation of fluid being carried out either by natural convection in the case of a gas or by forced convection. It is also possible in accordance with the invention to admit the fluid F into the thermal accumulator in the form of gas or in a two-phase (gas-liquid) form and to discharge the fluid in a liquid form in order to store energy in the material C of the thermal accumulator. The latent heat of liquefaction of the fluid F is thus gained and the transfer of heat between the heat-transporting fluid F and the material C takes place at a constant temperature difference, that is to say the temperature difference between the temperature of condensation of the fluid F and the temperature of liquefaction of the material C. The pressure within the vessel containing the material C is chosen so as to ensure that the temperature of condensation of the fluid F is in the vicinity of the melting point of the material C.

In another embodiment of the invention, the thermal accumulator comprises within each tray a horizontal capillary structure which is secured to the tray and located at the free surface of the material C, and said material C and the heat-transporting fluid F have very different densities and surface tensions at the melting point of the storage material C'.

In order to prevent entrainment of the storage material in the liquid state by the fluid F, it is advisable to guarantee retention of the storage compound on its support. This can be achieved in accordance with the invention by placing in position a capillary structure which stabilizes the interface between the fusible material C and the heat-transporting fluid F. In order to ensure efficient retention, the surface tensions and densities of the material C and of the heat-transporting fluid F must necessarily be as different as possible.

In accordance with the invention, said capillary structure is either a horizontal wire-fabric element or a horizontal sintered-metal plate having an open capillarity, these two elements being placed so as to coincide with the interface between the material C and the fluid F when the material C is in the liquid state. An adapted form of grooving of the support is also suitable for this purpose.

At the time of fusion of the storage material, the interface tension between the heat-transporting fluid and the fused material maintains the separation of these latter with the aid of the capillary structure. In contrast to the storage material C, the heat-transporting agent F is chosen so as to have the lowest possible degree of wettability if said agent is a liquid.

In order not to leave too great a space between the material C in the solid state and the wire-fabric element or the metallic separating plate, it is necessary to ensure that the coefficient of expansion per unit volume of the material C is as low as possible.

The use of metals such as cadmium which has a melting point of 320° C. and a surface tension of 630 dynes/cm or gallium which has a melting point of 30° C. and a surface tension of 360 dynes/cm is theoretically advantageous although somewhat burdened by considerations of cost.

In the temperature range of 350° C. to 470° C. in which a large number of industrial applications are possible, one of the pairs consisting of storage material and heat-transporting fluid among those which offer the highest performance is constituted by:

in the case of the storage material, one of the following mixtures:

(1) a eutectic mixture having a molar ratio of 52% beryllium fluoride and 48% lithium fluoride (melting point 356° C.)
(2) a eutectic mixture having a molar ratio of 33.3% beryllium fluoride and 66.7% lithium fluoride (melting point 456° C.)
(3) a eutectic mixture having a molar ratio of 20% beryllium fluoride and 80% lithium fluoride (melting point 457° C.).

So far as the heat-transporting fluid is concerned, it is possible to employ potassium, sodium or a potassium-sodium alloy.

The data relating to the density ratios are recorded in the table given on the last page. There can thus be observed a ratio which is highly conducive to good separation between the eutectic mixtures and the storage material, namely potassium in this case.

It is readily apparent that, apart from the nature of the heat-transfer and storage compounds, optimization of retention is determined by the size of the wire-fabric meshes and the rate of flow of the heat-transporting fluid which has to be adjusted separately.

The present invention is also concerned with a thermal accumulator having latent heat of fusion and direct contact, wherein said accumulator comprises:

a closed vessel E containing the material C and the fluid F,
means for circulating the fluid F within the vessel E,
means for withdrawing the material C at the point at which said material is in the liquid state and spraying this latter in the form of droplets into the fluid F, spraying being carried out near the top of the vessel E,
means for heating and cooling the fluid F by means of external heat sources.

When it is desired to store heat within the material C, the external source transfers its heat to the fluid F which liquefies the material C and the heat is stored in the thermal accumulator in the form of latent heat of fusion. When it is desired to recover the heat, the fluid F is reheated by causing solidification of the material C and the thermal accumulator re-transfers this heat to an external installation by means of the fluid F.

In one embodiment of the invention, the thermal accumulator comprises a vessel E' which communicates with the lower end of the vessel E by means of a valve, and means for heating the material C which is stored within the vessel E' in the molten state. When the material C is within the vessel E', it must essentially be maintained in the molten state in order to be recycled without difficulty. To this end, it is an advantage to ensure that the vessel E' is heat-insulated with a maximum degree of effectiveness and heating means can be added in order to maintain the temperature of the liquid material C at a constant value. These heating means serve to compensate for the heat losses of the vessel E'.

In another embodiment of the invention, the thermal accumulator comprises:

a first pumping circuit constituted by a pipe which is located outside the vessel E' and serves to connect an opening in the vicinity of the lower end of the vessel E' to an opening in the vincinity of the upper end of the vessel E, a pump, a liquid filter and a spray nozzle, said spray nozzle being located within the vessel E at the upper end of said pipe, a second pumping circuit constituted by a pipe which is located outside the vessel E and serves to connect the upper end to the lower end of the vessel E, part of said pipe being so arranged as to constitute the secondary circuit of a heat exchanger $C_1$, and a pump for circulating the fluid F within said pipe.

The primary circuit of the heat exchanger $C_1$ is connected to the external heat source, the heat exchanger $C_1$ being employed for supplying heat to the heat-transporting fluid F.

The accumulator also comprises a third pumping circuit constituted by a pipe located outside the vessel E and serving to connect the upper end of the vessel E to an intermediate inlet in the vessel E, said inlet being located above the maximum level of the bed of solid particles of material C. This bed of solid particles is deposited at the bottom of the vessel E. The particles of material C are retained for example by a filter having hole sizes which are smaller than the diameter of the particles of material C. In this form of construction of the accumulator, part of the pipe of the third pumping circuit constitutes the primary circuit of a heat exchanger $C_2$. The secondary circuit of said heat exchanger $C_2$ is connected to an installation which recovers the energy delivered by the fluid F when the accumulator is employed for the restitution of heat.

In a further embodiment of the invention, the accumulator comprises:

a first circuit constituted by a pipe having one end which extends into the vessel E in the vicinity of the top of said vessel, a pump and a convergent-divergent venturi tube having its opening in the vicinity of the upper end of the same vessel E, part of the pipe being so arranged as to constitute the primary circuit of a heat exchanger $C_2$, a second circuit constituted by a pipe fitted with a filter and connecting the lower end of the vessel E' to the throat of the venturi tube, a third circuit for pumping the fluid F and constituted by a pipe and a pump, said pipe being so arranged as to connect an opening formed in the vessel above the maximum level of the bed of solid particles of material C to an inlet located in the vicinity of the lower end of the vessel E, part of said pipe being so arranged as to constitute the secondary circuit of a heat exchanger $C_1$.

The present invention offers a large number of advantages over conventional heat accumulation systems. Among these can be noted in particular: the elimination of thermal contact resistances caused by variation in volume of the fusible accumulation compound during the change of phase; enhanced heat-transfer coefficient, the heat transfer being direct and thus resulting in a shorter charge time and higher available thermal flux; a reduction in cost price by suppression of thermal flux adapters such as fins, heat ducts and the like which are always costly, and a reduction in surface area of insulating walls.

Further properties and advantages of the invention will become more readily apparent from the following description in which examples of construction are given by way of explanation but not in any limiting sense, reference being made to the accompanying drawings, wherein:

FIG. 1 shows a vessel E provided with a plurality of trays containing the material C and a circulation system for the heat-transporting fluid;

FIG. 2a shows a crystallized storage material surmounted by a fine-mesh wire-fabric element and FIG. 2b shows the molten storage material which comes to the level of the fine-mesh wire-fabric element so that the contact between the heat-transporting fluid and the material C is located at the level of said fine-mesh wire-fabric element;

FIG. 3 shows a storage material C separated from the heat-transporting fluid by a plate of sintered material having an open-pore structure;

Figure 4:
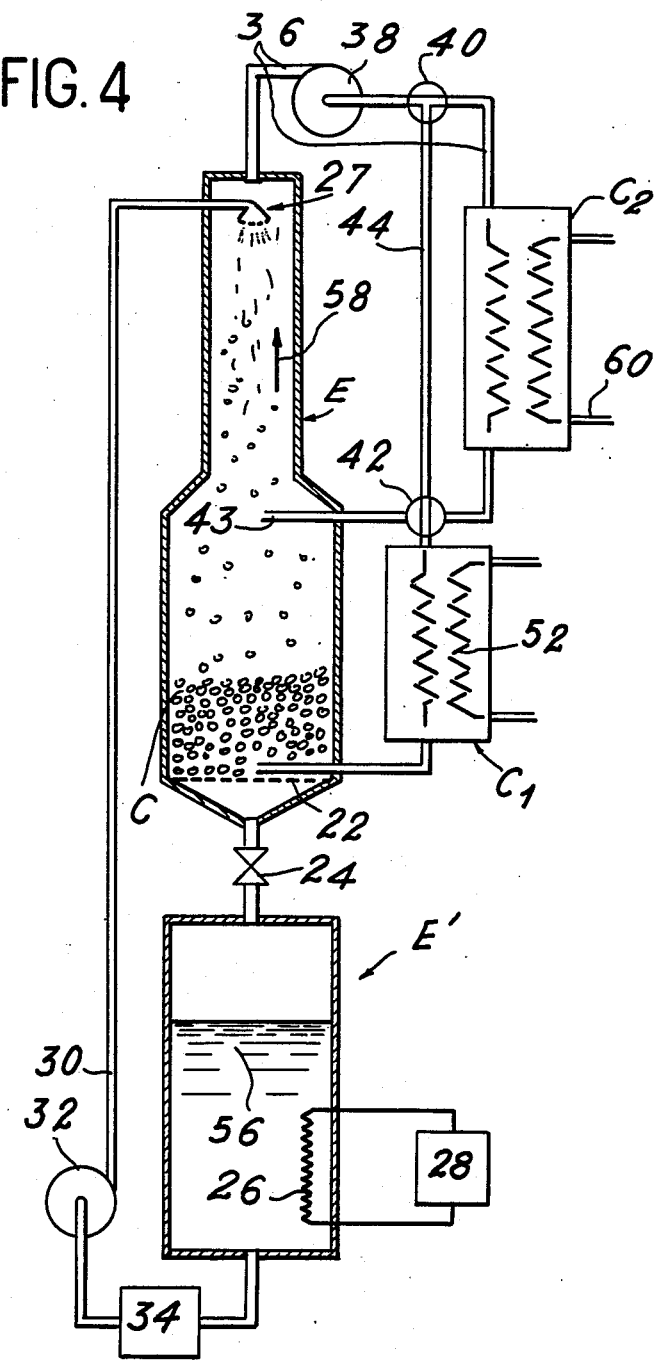
FIG. 4 shows an alternative form of construction of the accumulator in accordance with the invention.

There is shown in FIG. 1 a vessel E provided with a plurality of vessels as designated by the reference 2, the material C being stored in each tray and a wire-fabric element for example as designated by the reference 4 is attached to the tray 2 and placed above said material C. Openings as designated by the reference 6 enable the heat-transporting fluid F to circulate through the vessel in contact with the material C contained in each tray 2. In the case shown in the figure, the heat-transporting fluid is admitted at 10 in the direction of the arrow 8 and the heat-transporting fluid is discharged at 12. Circulation of the heat-transporting fluid is performed either by natural convection if the fluid is a gas, by virtue of the thermal gradients which are established within the vessel E, or by forced convection in which case the gas or the liquid is circulated by the pump 14. Should it be necessary to introduce a two-phase mixture to be condensed within the vessel E, it is an advantage to introduce this mixture at 12, in which case the condensed liquid is discharged at 10 since the liquid tends to fall to the lowermost point of the vessel under the action of gravity.

FIG. 2a shows the crystallized storage material C above a metal bottom-plate 16 and located beneath a fine-mesh wire-fabric element 4; the heat-transporting fluid circulates in the direction of the arrow 18. The height $a$ represents the expansion of the material C in a direction at right angles to the wire-fabric element when said material undergoes a transition from the solid state to the liquid state. As can be seen in FIG. 2b, said space is calculated so as to ensure that the interface between the heat-transporting fluid and the storage compound C coincides with the capillary structure when the storage material C has melted.

FIG. 3 shows the case of a heat-transporting fluid F-material C interface constituted by a capillary structure formed of sintered material 20 having open porosity.

FIG. 4 shows one form of construction of the thermal accumulator in accordance with the invention. The accumulator comprises a vessel E which contains the fluid F and the material C in divided form. A filter 22 retains the bed of solid particles constituted by the material C. The vessel E communicates with a vessel E' through a valve 24. The vessel E' contains the material C in liquid form. A resistor 26 fed from a voltage supply 28 serves to maintain the material C in the liquid state within the vessel E'. The pipe 30 fitted with a pump 32 and with a liquid filter 34 connects the lower end of the vessel E' to the upper end of the vessel E. The end of the pipe 30 terminates in a spray nozzle 27. The pipe 36 fitted with a pump 38 and with valves 40 and 42 connects the upper end of the vessel E to an opening 43 located above the maximum level of the bed of material C within the vessel E. Part of the pipe 36 constitutes the primary circuit of the heat exchanger $C_2$. The pipe 44 which is mounted as a by-pass across the pipe 36 through the valves 40 and 42 connects the upper end of the vessel E to the lower end of the same vessel. Part of the pipe 44 constitutes the secondary circuit of the heat exchanger $C_1$.

The operation of the thermal accumulator is as follows: in the heat-accumulation operation, the primary circuit 52 of the heat exchanger $C_1$ carries a stream of hot liquid which exchanges heat with the fluid F as this latter circulates within the pipe 44. The valves 40 and 42 are in a position such that the heat exchanger $C_2$ is out of circuit. The fluid F which is re-heated by passing through the heat exchanger $C_1$ circulates within the vessel E while liquefying part of the material C. This material C is discharged into the vessel E' in liquid form by opening the valve 24. The thermal flux supplied by the resistor 26 is of very low value compared with the enthalpy of fusion of the material composed of molten salt. The supply of heat can be interrupted for a period of several hours provided that the thermal insulation of the vessel E'0 has been carried out with care.

In the stage of restitution of stored energy, the material fused at 56 within the vessel E' passes through a cleaning filter 34 and is pumped by the pump 32 into the pipe 30 towards the upper end of the vessel E. In this mode of operation, the valves 40 and 42 are so oriented that the heat exchanger $C_1$ is out of operation and the heat exchanger $C_2$ is in action. The pump 38 causes the fluid F to circulate in the direction of the arrow 58 in counterflow to the material C as this latter falls from the upper end of the pipe which penetrates into the vessel E. The fluid F is heated as it comes into contact with the liquid C whilst the material C solidifies. The heat is recovered in the secondary circuit 60 of the heat exchanger $C_2$ and is directed towards an installation (not shown in the figure) in which this heat is utilized.

Devices of known type make it possible at different levels of the vessel E to regulate the velocity and size of the particles as well as the velocity of the heat-transporting fluid in order to promote heat exchanges and settling of the material C.

Figure 5:
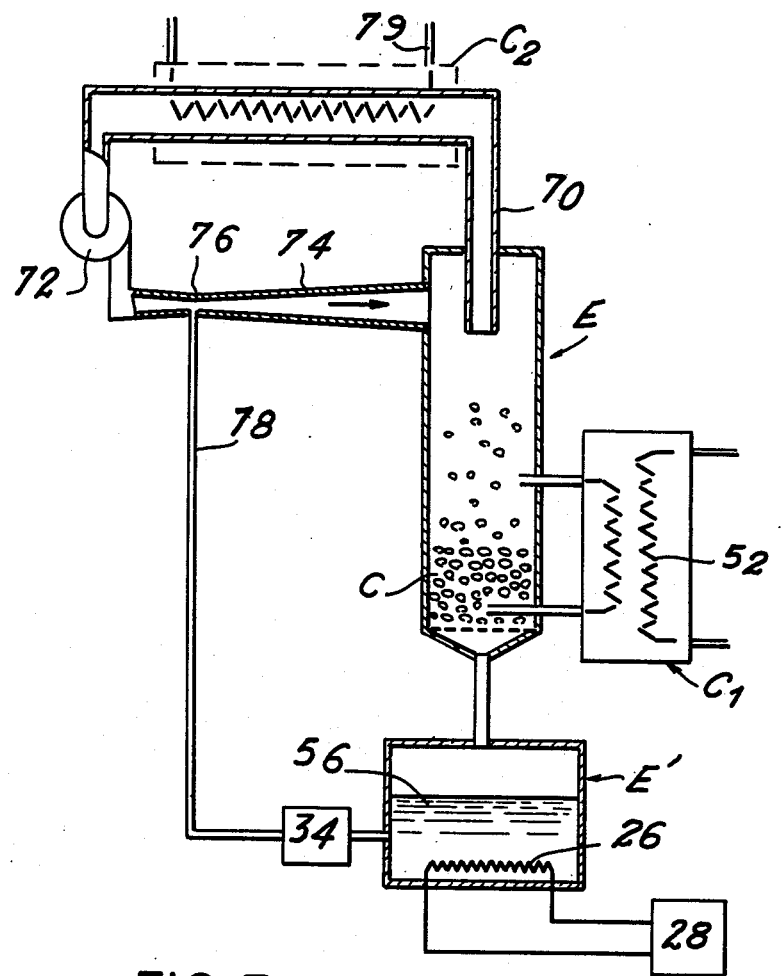
FIG. 5 shows another alternative form of construction of the heat accumulator in accordance with the invention.

In another preferential form of construction of the device in accordance with the invention as shown in FIG. 5, continuous operation may be carried out with greater ease. The heat flux admitted through the heat exchanger $C_1$ can be instantaneously different from the flux extracted by the heat exchanger $C_2$. In this form of construction, there is also employed a vessel E, a vessel E' connected to said vessel E and a heat exchanger $C_1$ for circulating the fluid F through the bed of solid material C. The heat-extraction circuit for the fluid F is constituted by a pipe 70 which extends into the upper end of the vessel E, said pipe being fitted with a pump 72 and a convergent-divergent venturi tube 74 which has its opening in the vicinity of the upper end of said vessel E. At the throat 76 of the venturi tube 74, a pipe 78 serves to withdraw the liquid 56 stored in the vessel E'. As in the device shown in FIG. 4, the energy is stored in the form of enthalpy of fusion of the material C by introduction of energy in the heat exchanger $C_1$. The energy is recovered in the secondary circuit 79 of the heat exchanger $C_2$, the primary circuit of which carries the fluid F which circulates within the pipe 70, the pump 72 and the venturi tube 74. The throat of said venturi tube sucks the molten material by virtue of the driving energy of the stream of fluid F which is accelerated by the pump 72. The droplets of liquid which solidify in cocurrent flow within the divergent portion of the venturi tube 74 settle within the vessel E after separation of the fluid F which is recycled to the heat exchanger through the pipe 70. In this device, a turbulent zone is established in the vicinity of the upper end of the vessel E, thus introducing a field of force which is greater than that of the gravitational field. In consequence, it is possible to employ materials C and fluids F having densities which are less different from each other than in the device of FIG. 4.

| Compound (A + B) | mole % of A | mole % of B | ΔH of fusion (Wh/liter) | θf (° C) | ρ (g/cm³) | ρ of K (g/cm³) at θf salt | ρ(θf)/ρ(K at θf) |
|---|---|---|---|---|---|---|---|
| Be F$_2$-LIF | 52 | 48 | 445 | 356 | 1.857 | 0.802 | 2.32 |
| Be F$_2$-LIF | 33.3 | 66.7 | 503 | 456 | 1.882 | 0.791 | 2.38 |
| Be F$_2$-LIF | 20 | 80 | 565 | 457 | 1.935 | 0.791 | 2.45 |

What we claim is:

1. A thermal accumulator wherein a heat transporting fluid F is passed in direct contact over a material C having a high latent heat of fusion comprising:
    a closed vessel E containing the material C and the fluid F, in a divided form, said vessel having a top and a bottom,
    means for heating or cooling the fluid F by means of external sources,
    means for circulating the fluid F within the vessel E,
    means for withdrawing the material C from the lower end of the vessel E at the point at which said material is in a molten liquid state, and for storing the molten liquid material C in a vessel E' when the means for heating or cooling the fluid F is in a heating phase, and,
    means for spraying the molten liquid material C, stored in the vessel E' when in the form of droplets into direct contact with the fluid F, at the top of the vessel E, the means for heating or cooling the fluid F is in a cooling phase.

2. An accumulator according to claim 1, wherein the vessel E' communicates with the vessel E by means of a valve, the vessel E including means for heating the material C stored in the liquid molten state.

3. A thermal accumulator according to claim 2, wherein said accumulator includes:
    a first pumping circuit constituted by a first pipe located outside the vessels E and E' for connecting an opening in the vicinity of a lower end of the vessel E' to an opening in the vicinity of an upper end of the vessel E, a first pump, a liquid filter and a spray nozzle, the spray nozzle being located within the vessel E at an upper end of the pipe,
    a second pumping circuit constituted by a second pipe located outside the vessel E and a second pump for connecting the upper end of the vessel E to the lower end of the vessel E, part of the second pipe being so arranged as to constitute the secondary circuit of a heat exchanger $C_1$,
    a third pumping circuit constituted by a third pipe located outside the vessel E for connecting the upper end of the vessel E to an intermediate inlet in the vessel E, the intermediate inlet being located above a maximum level of a bed of solid particles of material C deposited at the bottom of the vessel E, part of the third pipe being so arranged as to constitute the primary circuit of a heat exchanger $C_2$.

4. A thermal accumulator comprising:

a material C having a high latent heat of fusion, said material C having a granular solid phase and a molten liquid phase;

a closed vessel E for containing said material C in said granular solid phase, said vessel E having a top end and a bottom end;

a closed vessel E' for containing said material C in said molten liquid phase, said vessel E' having a top end and a bottom end;

first conduit means establishing communication between said bottom end of said vessel E and said top end of said vessel E';

second conduit means establishing communication between said bottom end of said vessel E' and said top end of said vessel E, a first source external of said vessel E for supplying heat via a fluid F to said material C, said fluid F heated by said first source circulating through and in direct contact with said material C in said granular solid phase, said fluid F heating said material C to change said material C from said granular solid phase to said molten liquid phase, said material C in said molten liquid phase passing from said bottom end of said vessel E to said top end of said vessel E' via said first conduit;

means for spraying in droplet form said material C in said molten liquid phase into the top end of said vessel E, said material C in said molten liquid phase being supplied to said means for spraying from said bottom end of said vessel E' via said second conduit; and a second source external of said vessel E for extracting heat via a said fluid F from said material C, said fluid F cooled by said second source circulating through and in direct contact with said droplets, said fluid F cooling said droplets of said material C in said liquid molten phase, said droplets changing to said material C in said granular solid phase.

* * * * *